US012488074B2

(12) United States Patent
Smith-Creasey (10) Patent No.: US 12,488,074 B2
(45) Date of Patent: Dec. 2, 2025

(54) COMPUTER-IMPLEMENTED CONTINUOUS CONTROL METHOD, SYSTEM AND COMPUTER PROGRAM (71) Applicant: BRITISH TELECOMMUNICATIONS PUBLIC LIMITED COMPANY, London (GB)

(72) Inventor: Max Smith-Creasey, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 296 days.

(21) Appl. No.: 17/910,962

(22) PCT Filed: Feb. 19, 2021

(86) PCT No.: PCT/EP2021/054111
§ 371 (c)(1),
(2) Date: Sep. 12, 2022

(87) PCT Pub. No.: WO2021/180443
PCT Pub. Date: Sep. 16, 2021

(65) Prior Publication Data
US 2023/0148327 A1 May 11, 2023

(30) Foreign Application Priority Data

Mar. 13, 2020 (EP) .................................... 20163125
Mar. 13, 2020 (GB) .................................... 2003667

(51) Int. Cl.
G06F 21/32 (2013.01)
G06F 21/31 (2013.01)
(52) U.S. Cl.
CPC ............ G06F 21/32 (2013.01); G06F 21/316 (2013.01); G06F 2221/2141 (2013.01)

(58) Field of Classification Search
CPC ........ G06F 21/32; G06F 21/34; G06F 21/121; G06F 21/128; G06F 21/316;
(Continued)

(56) References Cited
U.S. PATENT DOCUMENTS 7,506,162 B1* 3/2009 Hsu .................... H04L 63/0815
713/168
7,836,510 B1* 11/2010 Angal ................. G06F 21/6218
726/8
(Continued)

FOREIGN PATENT DOCUMENTS

CN   106920102   7/2017
CN   108701310   10/2018
(Continued)

OTHER PUBLICATIONS

International Search Report and Written Opinion of the ISA for PCT/EP2021/054111 dated May 20, 2021 (14 pages).
(Continued)

Primary Examiner — Sharif E Ullah
(74) Attorney, Agent, or Firm — Nixon & Vanderhye P.C.

(57) ABSTRACT

The present disclosure relates to improving ways of making decisions made by, or with the assistance of, computing systems. One aspect relates to a computer-implemented continuous control method, the method comprising: obtaining a policy decision according to an application of a policy to an inference; the inference being of an authorised user's state of mind over a time interval, determined according to a plurality of biometric readings obtained passively from the user over the time interval for continuous authentication of the user; the user's identity having been continuously authenticated according to the plurality of biometric readings; and causing one or more actions in accordance with the policy decision. Further aspects relate to a data processing system comprising means for carrying out such a method, a
(Continued)

computer program comprising instructions which, when the program is executed by a computer, cause the computer to carry out such a method, a computer-readable data carrier having stored thereon such a computer program and a data carrier signal carrying such a computer program.

16 Claims, 3 Drawing Sheets

(58) Field of Classification Search
CPC ..... G06K 2009/00932; G06K 9/00885; G06K 9/00006; G06K 9/00087; H04L 63/0861; H04L 9/3231; H04L 63/0428; H04L 63/0846; G07C 9/00158; G07C 9/00087; G07C 2209/12
USPC .......... 726/22, 2, 21, 36; 713/150, 163, 181; 380/255, 264, 276
See application file for complete search history.

(56) References Cited

U.S. PATENT DOCUMENTS

| | | | |
|---|---|---|---|
| 8,764,656 B2 | 7/2014 | Shin et al. | |
| 8,869,244 B1* | 10/2014 | Sundaram | G06F 21/604 726/4 |
| 9,400,879 B2 | 7/2016 | Tredoux et al. | |
| 9,686,275 B2 | 6/2017 | Chari et al. | |
| 9,692,839 B2 | 6/2017 | Davis et al. | |
| 10,223,696 B2 | 3/2019 | Chen et al. | |
| 10,305,895 B2 | 5/2019 | Barry et al. | |
| 10,482,698 B2 | 11/2019 | Caterino et al. | |
| 2004/0177097 A1* | 9/2004 | Yu | G06Q 90/00 |
| 2006/0218630 A1* | 9/2006 | Pearson | G06F 21/41 726/8 |
| 2007/0183633 A1* | 8/2007 | Hoffmann | G06V 40/16 382/116 |
| 2007/0192326 A1* | 8/2007 | Angal | G06F 11/203 |
| 2008/0086759 A1* | 4/2008 | Colson | G06F 21/31 713/182 |
| 2008/0104415 A1 | 5/2008 | Palti-Wasserman et al. | |
| 2008/0178262 A1* | 7/2008 | Taniguchi | G06V 40/50 726/2 |
| 2010/0115114 A1* | 5/2010 | Headley | H04L 51/52 709/229 |
| 2010/0246902 A1* | 9/2010 | Rowe | G07D 7/121 382/115 |
| 2011/0001607 A1* | 1/2011 | Kamakura | G06V 40/1365 340/5.82 |
| 2011/0153727 A1* | 6/2011 | Li | H04L 63/102 709/203 |
| 2011/0251954 A1* | 10/2011 | Chin | G06Q 20/102 705/40 |
| 2011/0277016 A1* | 11/2011 | Hockings | G06F 21/41 726/8 |
| 2012/0005736 A1* | 1/2012 | Takahashi | G06Q 20/40145 726/7 |
| 2012/0016827 A1 | 1/2012 | Evans et al. | |
| 2012/0290592 A1* | 11/2012 | Ishii | G06F 16/256 707/754 |
| 2013/0066770 A1* | 3/2013 | Das | H04L 67/02 715/740 |
| 2013/0066945 A1* | 3/2013 | Das | G06F 8/60 709/203 |
| 2013/0067345 A1* | 3/2013 | Das | H04L 67/34 715/740 |
| 2013/0067469 A1* | 3/2013 | Das | G06F 9/5077 718/1 |
| 2013/0073670 A1* | 3/2013 | Das | H04L 67/30 709/217 |
| 2013/0073703 A1* | 3/2013 | Das | H04L 67/14 709/223 |
| 2013/0074064 A1* | 3/2013 | Das | G06F 9/5077 718/1 |
| 2013/0074179 A1* | 3/2013 | Das | G06F 9/452 726/18 |
| 2013/0110922 A1* | 5/2013 | Shih | G06Q 50/01 709/204 |
| 2013/0138964 A1* | 5/2013 | Joyce, III | H04L 9/3231 713/176 |
| 2013/0276085 A1* | 10/2013 | Sharaga | H04N 21/2662 726/8 |
| 2015/0242605 A1 | 8/2015 | Du et al. | |
| 2017/0223017 A1* | 8/2017 | Kohli | H04L 63/0853 |
| 2018/0315049 A1 | 11/2018 | Crowell et al. | |
| 2019/0053766 A1 | 2/2019 | Mijovic et al. | |
| 2019/0342298 A1 | 11/2019 | Chen et al. | |
| 2020/0167783 A1 | 5/2020 | Bermudez et al. | |

FOREIGN PATENT DOCUMENTS

| | | | |
|---|---|---|---|
| EP | 2 733 635 | 5/2014 | |
| EP | 3 009 950 | 4/2016 | |
| GB | 2 552 032 | 1/2018 | |
| WO | 2016/060738 | 4/2016 | |
| WO | WO-2016060738 A1 * | 4/2016 | ............ G06F 21/31 |
| WO | 2018/180134 | 10/2018 | |
| WO | 2019/048855 | 3/2019 | |

OTHER PUBLICATIONS

Combined Search and Examination Report for GB 2003667.9 dated Nov. 18, 2020 (13 pages).
Extended European Search Report for EP 20163125.6 dated Jul. 24, 2020 (9 pages).
Combined Search and Examination Report under Sections 17 and 18(3) issued for GB Application No. GB2008960.3 dated Feb. 22, 2021 (10 pages).
International Preliminary Report on Patentability issued for PCT/EP2021/054111 dated Sep. 22, 2022 (10 pages).
Combined Search and Examination Report under Sections 17 and 18(3) issued for GB Application No. GB2008962.9 dated Feb. 22, 2021 (10 pages).
Max Smith-Creasey et al., "Context Awareness for Improved Continuous Face Authentication on Mobile Devices" 2018 IEEE 16th Int. Conf. on Dependable, Autonomic & Secure Comp., 16th Int. Conf. on Pervasive Intelligence & Comp., 4th Int. Conf. on Big Data Intelligence & Comp., and 3rd Cyber Sci. & Tech. Cong (2018) (9 pages).
Adriana Esmeraldo de Oliveira et al., "A Security API for Multimodal Multi-biometric Continuous Authentication", 2011 Seventh International Conference on Computational Intelligence and Security (2011) (6 pages).
Luigi Patrono et al., "An Innovative Face Emotion Recognition-based Platform using a Mobile Device as a Virtual Tour", Journal of Communications Software and Systems, vol. 15, No. 2, Jun. 2019 (9 pages).
Daniel Hintze et al., "Cormorant: Towards Continuous Risk-Aware Multi-Modal Cross-Device Authentication"; ResearchGate, Conference Paper, Sep. 2015 (5 pages).
Farzana Rahman et al., "*Seeing beyond visibility*: A Four Way Fusion of User Authentication for Efficient Usable Security on Mobile Devices", 2014 Eighth International Conference on Software Security and Reliability—Companion, 2014 IEEE (9 pages).
Arun Ross et al., "Information fusion in biometrics" Pattern Recognition Letters 24 (2003) 2115-2125, Department of Computer Science and Engineering, Michigan State University (11 pages).
A. Kolakowska "Usefulness of Keystroke Dynamics Features in User Authentication and Emotion Recognition", Faculty of Electronics, Telecommunications and Informatics, Gdansk University of Technology, Gdansk, Poland, Advances in Intelligent Systems and Computing 551, Springer International Publishing AG 2018 (11 pages).
Mona Ghassemian et al., "Secure Non-public Health Enterprise (56)  References Cited

OTHER PUBLICATIONS

Networks", Accepted for publication in Proceedings for 2020 IEEE International Conference on Communications (ICC) (6 pages).

* cited by examiner

COMPUTER-IMPLEMENTED CONTINUOUS CONTROL METHOD, SYSTEM AND COMPUTER PROGRAM

This application is the U.S. national phase of International Application No. PCT/EP2021/054111 filed Feb. 19, 2021 which designated the U.S. and claims priority to GB 2003667.9 filed Mar. 13, 2020 and EP 20163125.6 filed Mar. 13, 2020, the entire contents of each of which are hereby incorporated by reference.

FIELD

The present disclosure relates to improving ways of making decisions made by, or with the assistance of, computing systems.

More specifically, aspects relate to a computer-implemented continuous control method, a data processing system comprising means for carrying out such a method, a computer program comprising instructions which, when the program is executed by a computer, cause the computer to carry out such a method, a computer-readable data carrier having stored thereon such a computer program and a data carrier signal carrying such a computer program.

BACKGROUND

In many situations, increasing automation has reduced opportunities for human error and sabotage. However, as computing systems increase human abilities to interact with one another, and with machines, the potential harm caused by mistakes and malicious behaviour can be multiplied.

Use of technology for interpersonal interactions can exacerbate ill-effects resulting from human behaviour. For example, the impact of an ill-advised comment made in casual conversation can be far wider if made in an email, which can be easily forwarded, than in person. Similarly, communications which could cause distress are more likely to be reconsidered, moderated or delayed in a face to face conversation with someone who is already visibly stressed than in remote correspondence where the recipient's mood is more difficult to judge.

In some situations, the consequences of adverse human behaviour in human-machine interactions have also become more severe as computer control has become more ubiquitous. For example, where a machine operator being in an inebriated state at work may once have posed a danger to themselves and their individual machine and workpiece, the associated threat can now extend to an entire production line under their control via a computer, and any other workers in the vicinity of any of the machinery being controlled. Similarly, where a disgruntled employee may once have been able to destroy or photocopy a small number of paper documents before leaving their employment, they could potentially delete or electronically copy a much larger number of digital files at the touch of a button.

Some attempts have already been made to mitigate the types of problem described above by requiring additional authentication at key decision points. For example, US 2017/0223017 A1 describes a process in which a user attempting a large mobile transaction triggers a prompt to the user to provide biometric data to assess whether they could be under coercion. For example, if an image of the user's face shows them frowning and a pulse measurement indicates an elevated heart rate then a coercion risk could be identified. In that case the transaction is denied, or additional security checks are required for the transaction to be processed.

Processes which require additional action at decision points can however slow down operation of a device. Further, if it is known that a particular mood-indicating biometric will be assessed at a particular moment, it may be possible for the 'correct' result to be spoofed. E.g., in the example of US 2017/0223017 A1 described above, the user could be instructed in breathing techniques to lower their heart rate and told to adopt a neutral or positive facial expression before attempting the transaction.

What is needed is a way of reducing the risks posed by human error, misjudgement and wrongdoing in interactions with computing systems, without causing unnecessary detriment to the function of those systems.

SUMMARY

According to a first aspect, there is provided a computer-implemented continuous control method comprising:
  obtaining a policy decision according to an application of a policy to an inference;
  the inference being of an authorised user's state of mind over a time interval, determined according to a plurality of biometric readings obtained passively from the user over the time interval for continuous authentication of the user;
  the user's identity having been continuously authenticated according to the plurality of biometric readings; and causing one or more actions in accordance with the policy decision.

The method can further comprise determining the inference prior to obtaining the policy decision.

The method can further comprise obtaining the plurality of biometric readings prior to obtaining the policy decision.

The plurality of biometric readings can comprise a plurality of biometric readings obtained from each of a plurality of user devices.

The plurality of biometric readings can comprise a respective plurality of biometric readings obtained for each of a plurality of biometrics.

Determining the inference can comprise:
  for each of the plurality of biometrics, making a biometric-specific inference of the user's state of mind over the time interval in dependence on the respective plurality of biometric readings;
  associating each of the biometric-specific inferences with a confidence score; and
  determining the inference by combining all of the biometric-specific inferences, each weighted in dependence on its associated confidence score.

The method can further comprise, for each of the biometric-specific inferences:
  obtaining contextual data such as one or more contextual measurements taken over the time interval; and
  determining the confidence score in dependence thereon.

The method can further comprise authenticating the user's identity according to the plurality of biometric readings prior to obtaining the policy decision.

The one or more actions can be one or more of:
  denying a request for functionality received from the user through a user interface;
  granting a request for functionality received from the user through a user interface;
  providing feedback to the user through a user interface;

communicating feedback to a separate computing device; and scheduling a future action.

The inference can be that the user is one or more of:

in a particular emotional state selected from a plurality of emotional states, such as stressed, afraid, angry or calm; and in a particular physiological condition selected from a plurality of physiological conditions, such as: under the influence of a mind-altering substance, suffering from a medical condition or experiencing fatigue.

Determining the inference can be performed by a classifier, the classifier optionally being trained on biometric data collected from a plurality of individuals, the classifier optionally comprising a support vector machine or artificial neural network.

According to a second aspect, there is provided a data processing system comprising means for carrying out the method of the first aspect.

According to a third aspect, there is provided a computer program comprising instructions which, when the program is executed by a computer, cause the computer to carry out the method of the first aspect.

According to a fourth aspect, there is provided a computer-readable data carrier having stored thereon the computer program of the third aspect.

According to a fifth aspect, there is provided a data carrier signal carrying the computer program of the third aspect.

BRIEF DESCRIPTION OF THE FIGURES

Aspects of the present disclosure will now be described by way of example with reference to the accompanying figures. In the figures.

DETAILED DESCRIPTION OF THE FIGURES

The following description is presented to enable any person skilled in the art to make and use the system, and is provided in the context of a particular application. Various modifications to the disclosed embodiments will be readily apparent to those skilled in the art.

The present disclosure provides a computer-implemented method in which an inference of a user's state of mind is used to determine a suitable action in accordance with a policy. The inference is based on biometric measurements already taken from the user to continuously authenticate their identity. In this way, in addition to the security provided by continuous authentication, improvements to the functioning of the computer system and/or the user's experience of it can be made by automatically adapting to/taking into account the user's mood or other mental state. The method is performed "in the background" from the user's perspective, with no unnecessary action being required of them and no unnecessary delays being introduced. The continuous nature of the biometric data collection can also increase the difficulty of spoofing the data, enabling increased security.

Biometrics are measurable, distinctive characteristics of a human which can be used to label and describe individuals. Individuals can therefore be identified using one, or a combination, of their biometrics. Biometrics include physiological characteristics and behavioural characteristics.

The biometric measurements on which the inference is based can for example comprise one or more of:

facial images, pulse measurements, gait measurements, breathing pattern measurements, chemical signature measurements (e.g. from breath and/or perspiration), voice recordings, handwriting scans, handling signature measurements (e.g. one or more of orientation, direction and/or speed and/or acceleration of translational and/or rotational motion, holding pressure, frequency of interaction and/or changes in and/or patterns of changes in one or more of these)

user interface interaction signature measurements (e.g. characteristic ways of one or more of typing, pressing buttons, interacting with a touch sensitive or gesture control device and viewing a display, for example determined through one or more of: force and pressure on a tactile interface; speed, rhythm, frequency, style and duration of interaction with a tactile or gesture based interface; and visual tracking of a display), and linguistic analysis measurements (e.g. from free text type and/or voice recordings).

Continuous authentication refers to authentication which takes place on an on-going basis. This is in contrast to traditional authentication, which is prompted by a specific external stimulus indicating a request for functionality requiring authentication. (In the traditional case, the request for functionality could be specific, for example requesting access to a protected file, or more general, for example requesting log-in to a device which then enables multiple functions of that device.) Continuous authentication is based on measurements obtained from a user passively, i.e. without the user being required to knowingly perform any particular prompted or remembered action.

Measurements to achieve continuous biometric authentication can be taken by sampling one or more continuous sensor outputs and/or by triggering one or more sensors as required. Measurements can be taken continually; i.e. one after another, as quickly as the measurement apparatus allows. Alternatively, measurements can be taken on a routine basis. For example a measurement or series of measurements could accompany any action or any of a class of actions (as opposed to a specific action) implemented on or by the device, e.g. handling of the device and/or use of any user input device comprised in the device and/or receipt or transmission of a communication by the device. Measurements could alternatively be taken on a particular temporal basis, for example a regular (e.g. periodic) basis, according to some other temporal pattern or randomly triggered (e.g. according to a stochastic variable).

Figure 1:
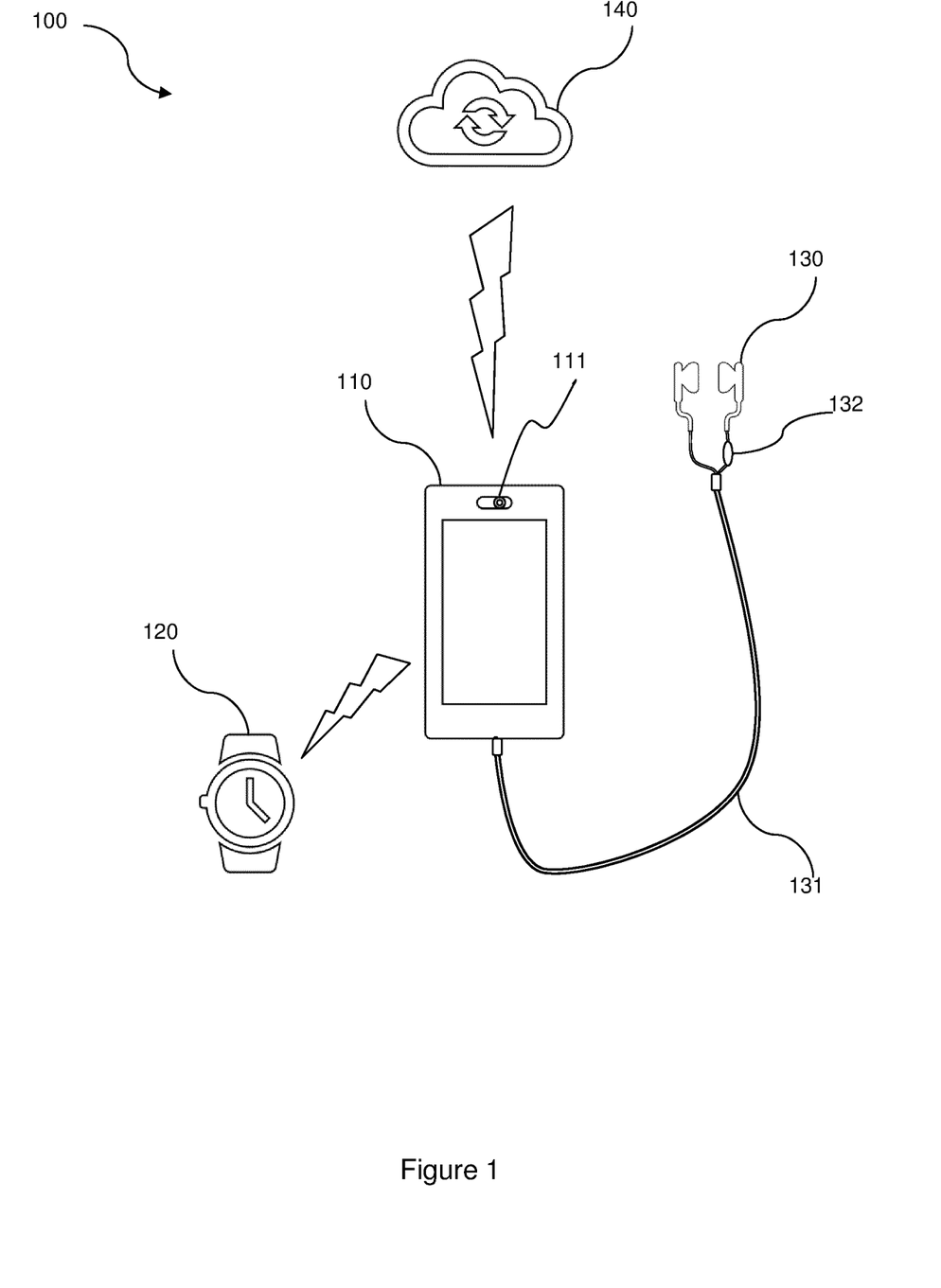
FIG. 1 illustrates an example system 100 in which the approach of the present disclosure can be employed.

FIG. 1 illustrates an example system 100 in which the approach of the present disclosure can be employed. A smartphone 110 comprises a front-facing camera 111 for capturing images of a user's face. A smartwatch 120, in wireless communication with the smartphone 110 (for example via Bluetooth™) comprises a pulse monitor, an accelerometer and a gyroscope (not shown). A pair of earbuds 130, connected to the smartphone 110 via a wire 131, comprises a microphone 132. The smartphone 110 is also in wireless (e.g. cellular) communication with one or more other computing devices such as servers (not shown) via a network 140 (e.g. the Internet).

Biometric measurements can be taken from one or more of the illustrated devices. The camera 111 of the smartphone 110 can be used to perform facial recognition for continuous authentication of the user's identity, as well as expression recognition to infer an emotional or physiological state of the user. The pulse monitor of the smartwatch 120 can be used to perform both continuous authentication and state of mind inference based on the user's heart rate. The accelerometer and gyroscope of the smartwatch 120 can feed into gait analysis to both continuously authenticate the user and infer their emotional and/or physiological state. The combination of data from the pulse monitor, accelerometer and gyroscope can be used to infer when the user is exercising, and modify inferences made based on their biometrics accordingly. Finally, the microphone can be used to continuously authenticate the user via voice recognition and infer their state of mind from one of more of their vocal pitch, volume, rhythm and speed.

It can be seen from the system 100 shown in FIG. 1 and described above that one or more biometrics can be used to both continuously authenticate a user and infer their state of mind. Where multiple biometrics are used, these can be collected by a single device or multiple devices. Processing of the raw biometric data collected can be performed by the device the data is collected by, or by another device in communication with it as appropriate in dependence on relative processing power, electrical power and memory available at each device. Some or all of the processing could be done by a device not illustrated, such as a remote server, communicably coupled to the smartphone 110 via the network 140.

Once the user has been continuously authenticated and their state of mind inferred, a policy is applied to determine an action to take. The policy could be stored on the device determining the action or remotely, but accessible by it. The policy could be set by the user or by a third party such as their employer. The policy could be fixed or open to modification. Such modification could be according to administrator action and/or automatic according to a machine learning algorithm. By way of example, a policy could be defined as follows.

| State of mind | Action(s) |
|---|---|
| Angry | Divert outgoing email to Drafts folder & notify user |
| Inebriated | Disable connected car ignition & notify user breath sample must be provided (and alcohol level test passed) to reenable<br>Divert outgoing email to Drafts folder & notify user |
| Calm | Enable all functions<br>Remind user of tasks on to do list<br>Log time interval over which calm state of mind can be inferred to inform automatic scheduling of future tasks |
| Frightened | Deny access to banking application<br>Notify emergency contact |
| Stressed | Disable incoming email notifications & turn on auto-reply with alternative contact details for urgent matters |
| Fatigued | Suggest taking a break |

Figure 2:
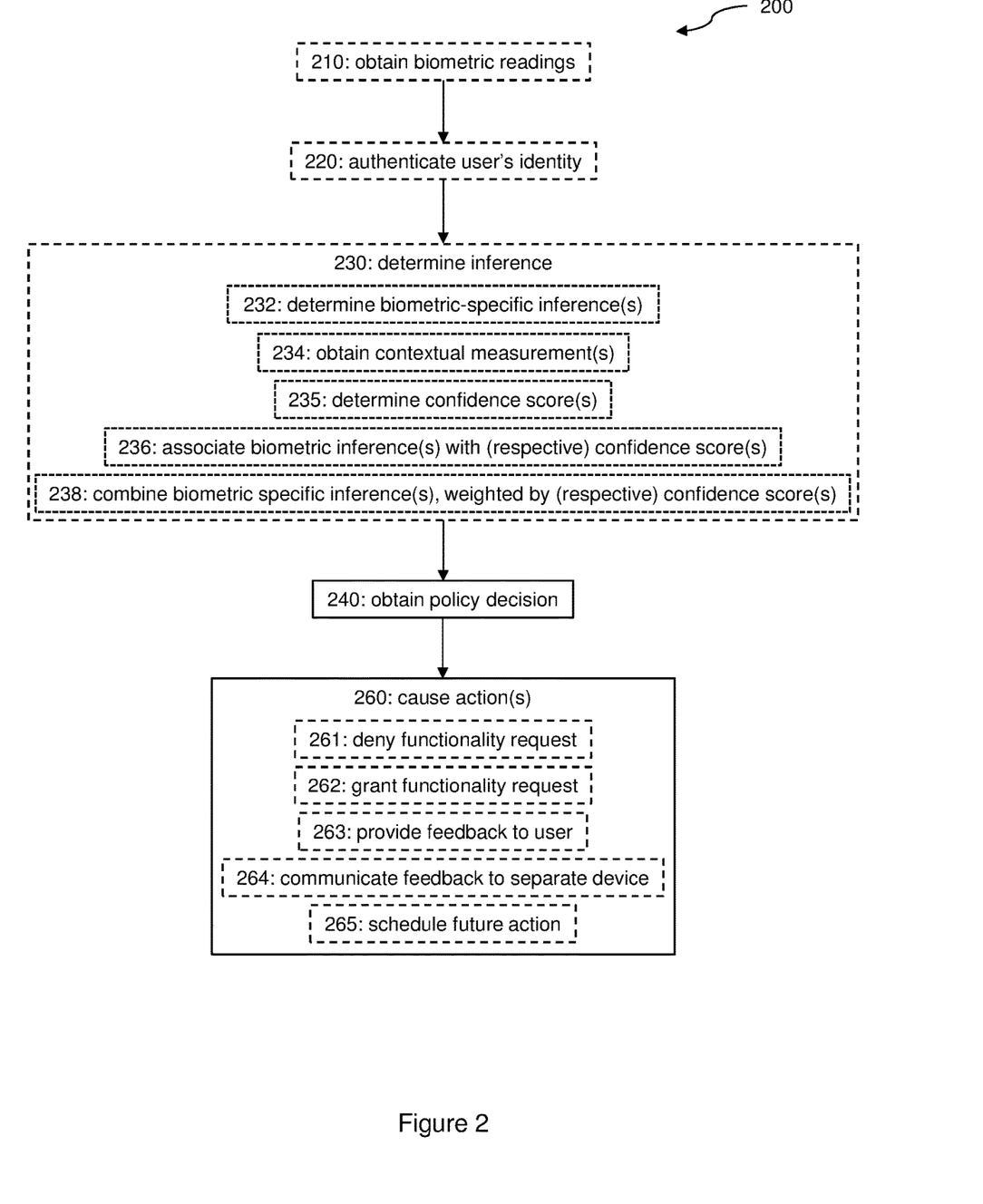
FIG. 2 is a flowchart illustrating an example computer-implemented continuous control method.

FIG. 2 is a flowchart illustrating an example computer-implemented continuous control method 200. The method 200 comprises obtaining a policy decision according to an application of a policy to an inference at step 240, then causing one or more actions in accordance with the policy decision at step 260. The inference is of an authorised user's state of mind over a time interval, determined according to a plurality of biometric readings obtained passively from the user over the time interval for continuous authentication of the user (the user's identity having been continuously authenticated according to the plurality of biometric readings). Obtaining the policy decision at step 240 can comprise determining the policy decision or receiving a policy decision made by a separate computing device.

The time interval can for example be between a tenth of a second and one minute. It can depend on the type of biometric readings. For example, photographs to determine facial expression are typically sampled at high frequency but over short time intervals, since facial expression can change from second to second. In contrast, heart rate measurements are typically taken over an interval of around a minute to reduce the risk of brief spikes being mischaracterised.

The method 200 can optionally comprise determining the inference at step 230, prior to obtaining the policy decision at step 240. Alternatively, the inference can be determined by a separate computing device and communicated to the computing device conducting the method 200.

The inference can optionally be that the user is one or more of:
  in a particular emotional state selected from a plurality of emotional states, such as stressed, afraid, angry or calm; and
  in a particular physiological condition selected from a plurality of physiological conditions, such as under the influence of a mind-altering substance, suffering from a medical condition or experiencing fatigue.

Determination of the inference at optional step 230 can optionally be performed by a classifier. The classifier can optionally comprise a support vector machine or artificial neural network. The classifier can optionally be trained on biometric data collected from a plurality of individuals. It can be refined for use by a particular user by means of a calibration process in which inferences are made and presented to the user for them to confirm or refute.

Determining the inference at optional step 230 can optionally comprise:
  for each of the plurality of biometrics, making a biometric-specific inference of the user's state of mind over the time interval in dependence on the respective plurality of biometric readings at step 232;
  associating each of the biometric-specific inferences with a confidence score at step 236; and
  determining the inference by combining all of the biometric-specific inferences, each weighted in dependence on its associated confidence score at step 238.

Weighting factors applied to each of the biometric-specific inferences can be proportional to the respective associated confidence scores or could be determined from the confidence scores in some other way. For example, confidence scores could be grouped into bands, with each band corresponding to a single weighting factor value. In either of these schemes, or any other, a confidence threshold could be applied such that the weighting factor value is set to zero if the confidence score is below a predetermined minimum.

The confidence scores can for example be based on known accuracies of biometric-specific inferences drawn from particular biometrics and/or known error bars associated with the biometric readings used to determine the biometric-specific inferences. Confidence scores can alternatively or additionally depend on the age of the associated biometric readings. For example, if a first type of biometric reading is updated more frequently then a second type of biometric reading, the confidence score associated with the first type of biometric reading could be higher than that associated with the second type of biometric reading.

The confidence scores could be fixed, or updateable by the user performing a calibration process in which biometric-specific inferences are made and presented to the user for them to confirm or refute.

The use of multiple biometrics to determine the inference can thus allow the inference to be drawn with reasonable confidence even if an individual biometric would not generally be sufficient. For example, an elevated heart rate alone could indicate several different physiological and emotional states, e.g. angry, stressed, frightened, excited or under the influence of certain drugs. However, an elevated heart rate could be used to corroborate an inference of one of those states from expression recognition in a facial image.

Optionally, optional step 230 can further comprise, for each of the biometric-specific inferences:
  obtaining contextual data, for example comprising one or more contextual measurements over the time interval at step 234; and
  determining the confidence score in dependence thereon at step 235.

For example, in the system 100 of FIG. 1, a contextual measurement associated with a facial image taken by the camera 111 of the smartphone 110 could be ambient light level. A confidence level associated with a biometric-specific inference drawn from expression detection based on that image could be lowered if the light level is below a predetermined threshold. Similarly, the accelerometer and gyroscope of the smartwatch 120 can be used to provide contextual measurements for the heart rate obtained from its pulse monitor. If the accelerometer and gyroscope measurements suggest the user is, or has recently been, exercising then a confidence level associated with a biometric-specific inference drawn from an elevated heart rate (e.g. that the user is stressed) can be reduced relative to a confidence level associated with that biometric-specific inference if the accelerometer and gyroscope measurements suggest that the user is stationary. Other contextual data to inform the inference could also be retrieved from the computing device's memory or received from another computing device. For example, the confidence level associated with the biometric-specific inference drawn from the elevated heart rate that the user is stressed could be reduced further if the user's calendar includes a recently completed gym class.

The use of contextual measurements to adjust confidence levels associated with biometric-specific inferences allows one or more secondary biometrics to be used as "back-ups" for a primary biometric-specific inference, in the event that the contextual measurements suggest that the primary biometric-specific inference may not be as accurate as usual at that time, or is for some reason unavailable. In some implementations, resources such as memory, processing and electrical power can be saved by only determining secondary biometric-specific inferences if the confidence level(s) associated with the primary biometric-specific inference is below a predetermined threshold.

The method 200 can optionally comprise obtaining the plurality of biometric readings at step 210 prior to obtaining the policy decision at step 240. Alternatively, if a separate computing device determines the inference then that same separate computing device obtains the plurality of biometric readings in order to do so. (If the same computing device is determining the inference and determining the policy decision, then it must obtain the plurality of biometric readings prior to performing either of those steps.) Obtaining the biometric readings at optional step 210 can comprise directly making biometric measurements or receiving them from a separate computing device. The plurality of biometric readings can comprise a plurality of biometric readings obtained from each of a plurality of user devices. The plurality of biometric readings can comprise a plurality of biometric readings obtained for each of a plurality of biometrics.

The method 200 can optionally comprise authenticating the user's identity according to the plurality of biometric readings at step 220 prior to obtaining the policy decision at step 240. Alternatively, the authentication can be performed by a separate computing device. The device which authenticates the user's identity must obtain the plurality of biometric readings in order to do so. Authentication of the user's identity and determination of the inference can therefore be performed by the same computing device. Alternatively, these actions can be performed by separate computing devices provided that both are able to obtain the requisite plurality of biometric readings.

The one or more actions caused in accordance with the policy decision at step 260 can optionally comprise one or more of:
  denying a request for functionality received from the user through a user interface at step 261;
  granting a request for functionality received from the user through a user interface at step 262;
  providing feedback to the user through a user interface at step 263;
  communicating feedback to a separate computing device at step 264; and
  scheduling a future action at step 265.

Figure 3:
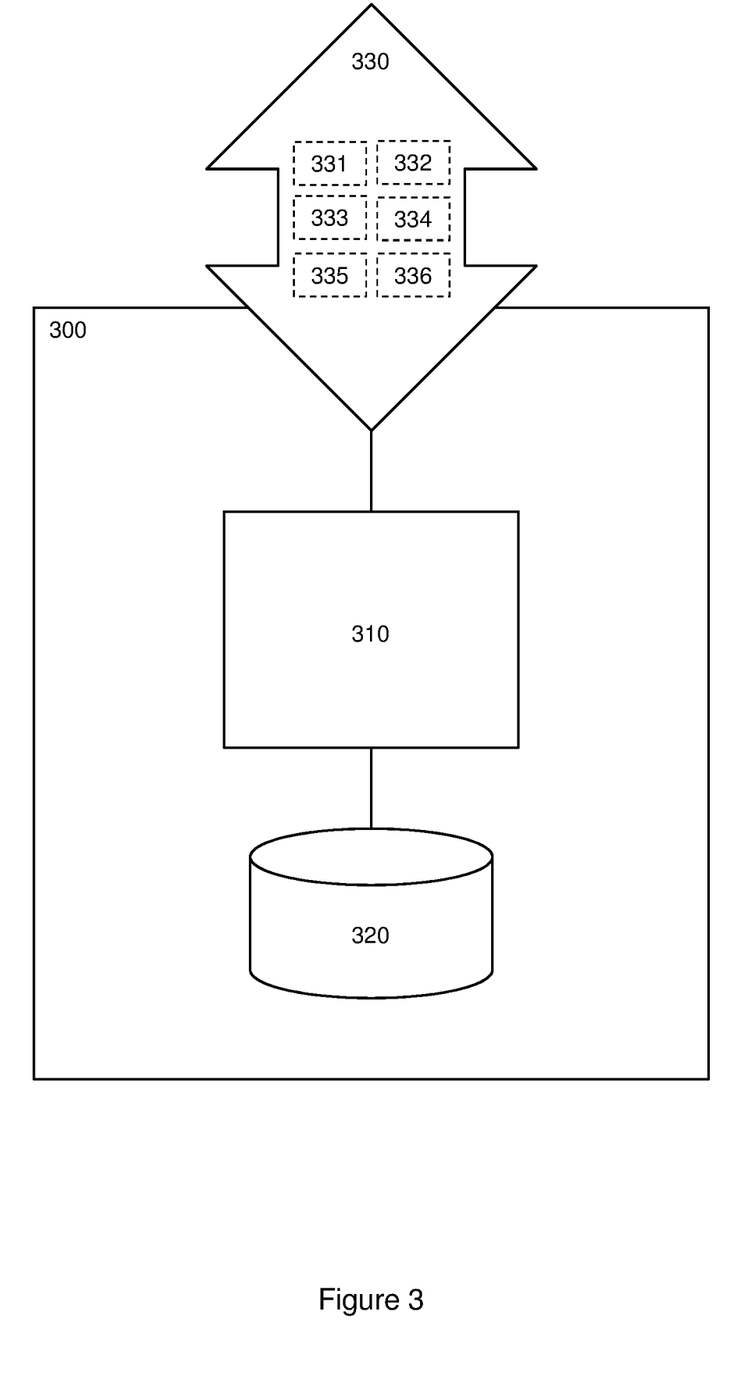
FIG. 3 schematically illustrates an example data processing system capable of performing the method of FIG. 2.

FIG. 3 schematically illustrates a data processing system 300 capable of performing the method 200. It comprises a processor 310 operably coupled to both a memory 320 and an interface 330.

The memory 320 can optionally comprise instructions which, when the program is executed by the processor 310, cause the data processing system 300 to carry out the method 200. Alternatively or additionally, the interface 330 can optionally comprise one or both of a physical interface 331 configured to receive a data carrier having such instructions stored thereon and a receiver 332 configured to receive a data carrier signal carrying such instructions.

The interface 330 can optionally comprise a receiver 332 configured to receive the inference.

The interface 330 can optionally comprise one or more biometric devices 333 configured to directly measure one or more of the plurality of biometric readings. Alternatively or additionally, the interface 330 can optionally comprise a receiver 332 configured to receive one or more of the plurality of biometric readings.

The interface 330 can optionally comprise one or more contextual measurement devices 334 configured to directly take one or more contextual measurements. Alternatively or additionally, the interface 330 can optionally comprise a receiver 332 configured to receive contextual data.

The interface 330 can optionally comprise one or more user interface devices 335 which can for example be configured to receive requests for functionality from the user and/or provide feedback to the user. Alternatively or additionally, the interface 330 can optionally comprise a transmitter 336 configured to communicate feedback to a separate computing device.

The receiver 332, when present, can comprise one or more wireless receiver modules and/or one or more wired receiver modules. Similarly, the transmitter 336, when present, can comprise one or more wireless transmitter modules and/or one or more wired transmitter modules.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. A computer-implemented continuous control method comprising:
    obtaining a policy decision according to an application of a policy to an inference;
    the inference being of an authorised user's state of mind over a time interval, determined according to a plurality of biometric readings obtained passively from the user over the time interval for continuous authentication of the users;
    the user's identity having been continuously authenticated according to the plurality of biometric readings; and
    causing one or more actions in accordance with the policy decision;
    the plurality of biometric readings comprise a respective plurality of biometric readings obtained for each of a plurality of biometrics;
    wherein determining the inference comprises:
        for each of the plurality of biometrics, making a biometric-specific inference of the user's state of mind over the time interval in dependence on the respective plurality of biometric readings;
        associating each of the biometric-specific inferences with a confidence score; and
        determining the inference by combining all of the biometric-specific inferences, each weighted in dependence on its associated confidence score:
    the method further comprises, for each of the biometric-specific inferences:
        obtaining contextual data; and
        determining the confidence score in dependence thereon.

2. The method of claim 1, further comprising determining the inference prior to obtaining the policy decision.

3. The method of either of claim 1, further comprising obtaining the plurality of biometric readings prior to obtaining the policy decision.

4. The method of claim 3, wherein the plurality of biometric readings comprise a plurality of biometric readings obtained from each of a plurality of user devices.

5. The method of claim 1, further comprising authenticating the user's identity according to the plurality of biometric readings prior to obtaining the policy decision.

6. The method of claim 1, wherein the one or more actions are one or more of:
    denying a request for functionality received from the user through a user interface;
    granting a request for functionality received from the user through a user interface;
    providing feedback to the user through a user interface;
    communicating feedback to a separate computing device; and
    scheduling a future action.

7. The method of claim 1, wherein the inference is that the user is one or more of:
in a particular emotional state selected from a plurality of emotional states; and
in a particular physiological condition selected from a plurality of physiological conditions.

8. The method of claim 2, wherein determining the inference is performed by a classifier, the classifier being trained on biometric data collected from a plurality of individuals, the classifier comprising a support vector machine or artificial neural network.

9. A non-transitory computer-readable data carrier having stored thereon a computer program comprising instructions which, when the program is executed by a computer, cause the computer to carry out the method of claim 7.

10. The method according to claim 1, wherein:
the biometric-specific inference of the user's state of mind over the time interval is made in dependence on captured images of the user's face as the plurality of biometric readings;
the obtained contextual data includes an ambient light level; and
confidence score associated with the biometric-specific inference is modified in dependence on the contextual data including the ambient light level.

11. The method according to claim 1, further wherein:
the biometric-specific inference of the user's state of mind over the time interval is made in dependence on the user's heart rate as the plurality of biometric readings;
the obtained contextual data relates to movement of the user; and
the confidence score associated with the biometric-specific inference is modified in dependence on the contextual data relating to the movement of the user.

12. A data processing system comprising: at least one hardware processor and memory storing a computer program including instructions which, when executed by the processor, cause the date processing system at least to be configured to:
obtain a policy decision according to an application of a policy to an inference;
the inference being of an authorised user's state of mind over a time interval, determined according to a plurality of biometric readings obtained passively from the user over the time interval for continuous authentication of the user;
the user's identity having been continuously authenticated according to the plurality of biometric readings; and
cause one or more actions in accordance with the policy decision;
wherein the data processing system is further configured to:
make a biometric-specific inference of the user's state of mind over the time interval in dependence on at least one of the plurality of biometric readings;
associate the biometric-specific inference with a confidence score;
obtaining contextual data; and
modify the confidence score in dependence on the obtained contextual data.

13. The data processing system according to claim 12, wherein the data processing system is a smart phone or computer tablet, the smart phone or computer tablet including a camera configured to capture images of the user's face as one of the biometric readings.

14. The data processing system according to claim 12,
wherein the data processing system includes a smart phone or computer tablet, the smart phone or computer tablet including a camera configured to capture images of the user's face as one of the biometric readings, and wherein:
the biometric-specific inference of the user's state of mind over the time interval in dependence on the captured images of the user's face as the at least one of the plurality of biometric readings;
the obtained contextual data includes an ambient light level; and
the confidence score associated with the biometric-specific inference is modified in dependence on the contextual data including the ambient light level.

15. The data processing system according to claim 12, wherein:
the data processing system includes a smart watch, the smart watch including a pulse monitor configured to measure the user's heart rate as one of the biometric readings, and the smart watch also including an accelerometer or a gyroscope;
the biometric-specific inference of the user's state of mind over the time interval is made in dependence on the user's heart rate;
the contextual data is obtained using the accelerometer or the gyroscope of the smart watch, the contextual data relating to movement of the user; and
the confidence score associated with the biometric-specific inference is modified in dependence on the contextual data relating to the movement of the user.

16. The data processing system according to claim 12, the one or more actions are one or more of:
denying a request for functionality received from the user through a user interface;
granting a request for functionality received from the user through a user interface;
providing feedback to the user through a user interface;
communicating feedback to a separate computing device; or
scheduling a future action.

* * * * *